UNITED STATES PATENT OFFICE 2,058,799

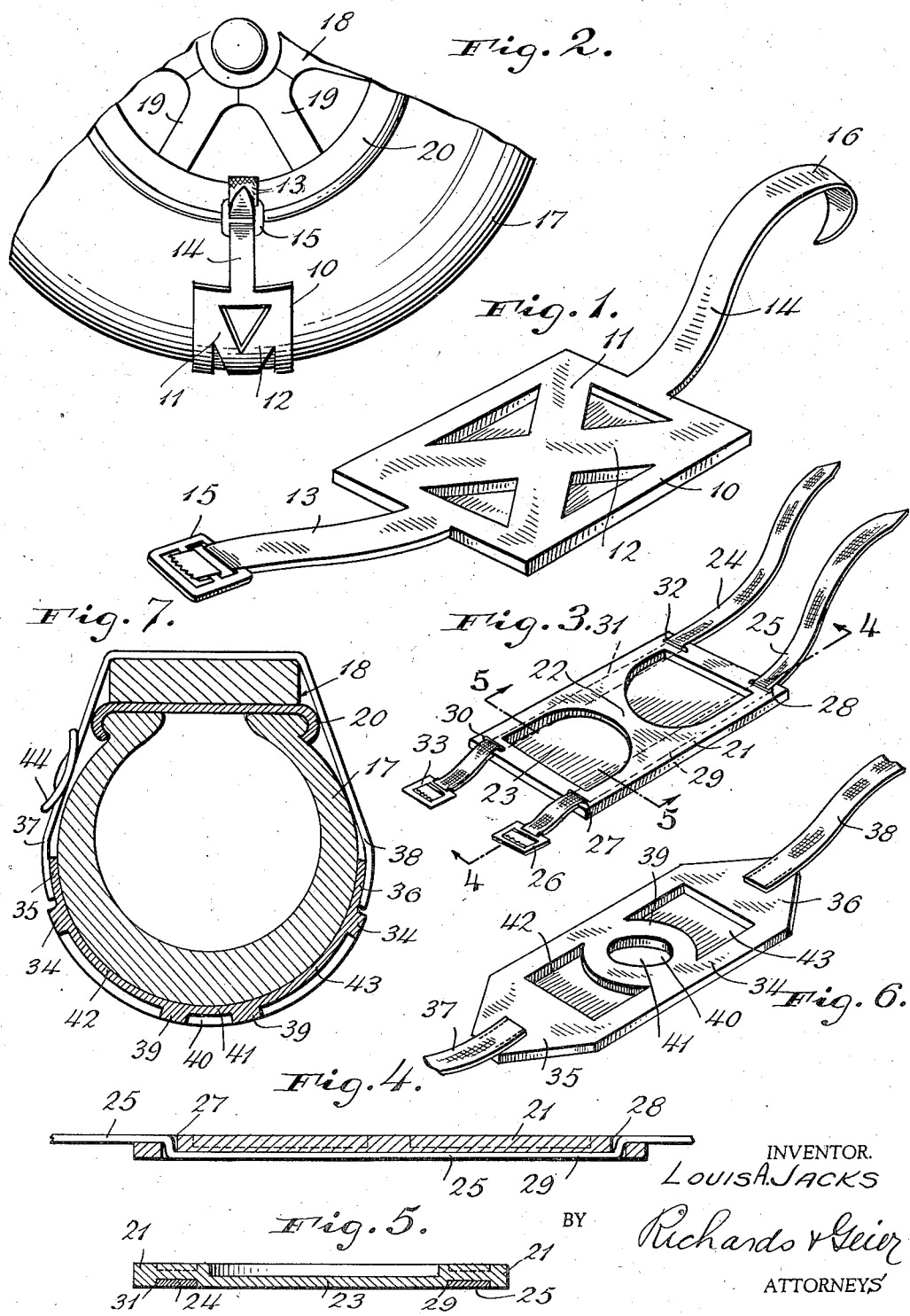

ANTISKID DEVICE FOR MOTOR VEHICLES AND THE LIKE

Louis A. Jacks, Newark, N. J.

Application April 3, 1935, Serial No. 14,459

1 Claim. (Cl. 152—14)

This invention relates to anti-skid devices for motor vehicles and the like and refers more particularly to transverse tread members applied to the wheels of an automobile to prevent skidding or slippage of the wheels on wet or icy roads.

An object of the present invention is the provision of an anti-skid device which is simple and inexpensive in construction, which will not injure the tread surface of a tire, and which will resist skidding or slippage more effectively than devices used heretofore.

The above and other objects of the present invention may be realized through the provision of a tread member for tires, which comprises a member having the shape of a frame and provided with bands or straps adapted to surround the tire and to be fastened together. The frame-shaped or frame-like member may be used along with other members situated within the frame and extending, for example, diagonally from one end of the frame to the other, although members having a different shape may be used.

The tread member is made of rubber, while the band attaching the tread member to the wheel may be made of rubber, a rubberized fabric, leather, or a fabric.

The invention will appear more clearly from the following detailed description when taken in connection with the accompanying drawing showing preferred embodiments of the inventive idea.

In the drawing:

Figure 1 is a perspective view of a tread member constructed in accordance with the principles of the present invention.

Figure 2 is a fragmentary side elevation of a vehicle wheel showing the tread member applied to this wheel.

Figure 3 shows in perspective a tread member of a somewhat different construction.

Figure 4 is a section along the line 4—4 of Figure 3.

Figure 5 is a section along the line 5—5 of Figure 3.

Figure 6 shows in perspective a tread member of a different construction.

Figure 7 is a cross-section through a wheel provided with the tread member illustrated in Figure 6.

The anti-skid device illustrated in Figures 1 and 2 is substantially strap-like in shape and comprises a member 10 having the shape of a rectangular frame. Bars 11 and 12 extend diagonally to opposite ends of the frame so that the tread member has substantially the shape of intersecting bars situated within a rectangular frame.

Straps or bands 13 and 14 are attached to opposite sides of the frame-like member 10. The strap 13 is provided with a suitable buckle 15 used for securely fastening the end portion 16 of the strap 14.

As shown in Figure 2, the anti-skid device is applied around the tire 17 of the wheel 18. The straps 13 and 14 are passed between the wheel spokes 19 and are fastened together by means of the buckle 15, so that the device surrounds a portion of the tire 17 and of the rim 20.

Any suitable number of tread members may be applied to each wheel, depending upon the condition of the road.

The anti-skid device illustrated in Figures 3 to 5 comprises a frame-like member 21 provided with a single transverse member 22 having the shape of an X and extending from the middle of one side of the frame to the middle of the opposite side thereof. As shown more clearly in Figure 5, the device also comprises a web 23 constituting the bottom of the tread member.

The tread member formed by the frame 21, the transverse member 22, and the web 23 is attached to the wheel by means of two straps 24 and 25 which may be made of a fabric.

As shown more clearly in Figures 3 and 4 of the drawing, the strap 25 which is provided with a buckle 26, passes through a vertical opening 27 formed in the frame-like member 21. A similar vertical opening 28 is provided on the opposite side of the frame-like member 21.

The two vertical openings 27 and 28 are interconnected by a longitudinal groove 29 having substantially the width of the strap 25 and extending along the entire length of the frame-like member 21. The strap 25 is situated in the groove 29 and is passed through the openings 27 and 28.

The strap 24 is passed through a similar vertical opening 30, a groove 31 and a vertical opening 32. The strap 24 is substantially similar to the strap 25 and is provided with a similar buckle 33.

The anti-skid device shown in Figures 6 and 7 comprises a frame-like member 34 which is provided with elongated end-portions or supporting members 35 and 36 situated on opposite sides of the member 34. The member 35 carries a strap or band 37 which may be made of fabric or rubberized fabric and which is sewn or otherwise attached to the member 35.

One end of another strap 38 is firmly attached to the member 36.

The transverse member 39 extending from one side of the frame-like member 34 to the other side of this member, has the shape of an annular disc so that a round cavity 40 is formed in the middle of the frame-like member 34. A web 41 extends across the cavity 40 and similar webs 42 and 43 extend from the transverse member 39 to the frame-like member 34.

As shown in Figure 7, the anti-skid device illustrated in Figure 6 is applied over the tire 17 and the rim 20, the two ends of the straps 37 and 38 being fastened together by means of a buckle 44.

The frame-like members forming a part of the tread members of the described anti-skid devices are much more effective than devices known in prior art which consist of tread ribs or chains.

Due to the provision of a frame-shaped member, the edges of such member are adapted to press against the ground as soon as the vehicle develops a tendency to skid, thereby preventing any further possibility of skidding. Furthermore, while the wheel is rotated, the whole space provided within the frame-shaped member exerts a suction upon the part of the ground under the anti-skid device while the device is being raised from the ground.

Due to the combination of these two features, namely, the application of edges upon the ground and the suction exerted by the frame-like member, the frictional forces developed in the course of the rotation of the wheel are increased to a very large extent so that any skidding, slippage or spinning of wheels on icy or wet roads is effectively prevented.

What is claimed is:

An anti-skid device, comprising a tread member which comprises a substantially rectangular frame-like member, an annular member situated within said frame-like member and extending from one side to the opposite side of the frame-like member, a web interconnecting said frame-like member and said annular member, and supporting members connected to opposite sides of said frame-like member; and a pair of straps, each strap being attached to a separate one of said supporting members, said straps securing said tread member around the tire of a wheel.

LOUIS A. JACKS.